United States Patent [19]

Byrne

[11] 4,019,014
[45] Apr. 19, 1977

[54] METHOD FOR HEAT WELDING SELENIUM
[75] Inventor: John Frank Byrne, Worthington, Ohio
[73] Assignee: Xerox Corporation, Stamford, Conn.
[22] Filed: Apr. 23, 1975
[21] Appl. No.: 570,677
[52] U.S. Cl. .............................. 219/118; 219/85 D; 219/230; 219/233; 228/119; 264/36; 264/DIG. 46; 427/140
[51] Int. Cl.² .......................................... B23K 11/16
[58] Field of Search ................ 219/85 D, 118, 119, 219/121 EB, 233, 229, 230; 228/119; 264/36, DIG. 46; 427/140; 346/76 R

[56] References Cited

UNITED STATES PATENTS

| | | | |
|---|---|---|---|
| 3,246,973 | 4/1966 | Bange et al. | 228/119 X |
| 3,562,366 | 2/1971 | Sohl | 264/36 X |
| 3,591,755 | 7/1971 | Cushman | 219/118 X |
| 3,594,206 | 7/1971 | Scarborough | 264/36 X |
| 3,789,423 | 1/1974 | Fawcett | 346/76 R |
| 3,814,645 | 6/1974 | Fletcher | 264/36 X |
| 3,838,288 | 9/1974 | Stolz et al. | 219/121 EB X |
| 3,914,145 | 10/1975 | Forler et al. | 427/140 X |

FOREIGN PATENTS OR APPLICATIONS 1,103,042  2/1968  United Kingdom ............... 219/229

Primary Examiner—J. V. Truhe
Assistant Examiner—N. D. Herkamp

[57] ABSTRACT

A technique for the repair of selenium photoconductor elements is disclosed. The particular method includes applying a concentrated heat source to a damaged area of the photoconductor in an oscillating motion traverse to the damaged area so as to effect a weld of same. The oscillating motion of the heat source enables quick melting and resolidification of a minute area of selenium wihout undesirable recrystallization of the photoconductor.

8 Claims, 6 Drawing Figures

METHOD FOR HEAT WELDING SELENIUM

BACKGROUND OF THE INVENTION

The field of the invention relates to the repair of damaged selenium photoreceptors by application of an oscillating heat welding source. More particularly, this invention relates to an oscillating heat welding method which efficiently produces an integral weld of a damaged area of a selenium photoreceptor. This invention contemplates the application of a heat source to a damaged area of a selenium photoreceptor in an orbitally oscillating motion so as to effect a mending of the damaged selenium.

The process of electrostatographic copying, as originally disclosed by C. F. Carlson in U.S. Pat. No. 2,297,691, involves the uniform electrostatic charging of a layer of photoconductive material dispersed on a conductive substrate with subsequent exposure of the charged layer to light and shadow to selectively discharge the photoconductive layer and thereby form a latent electrostatic image on the surface of the layer corresponding to the shadow areas. The latent image is developed by contacting the layer with a particulate electroscopic marking material, commonly referred to as toner, which adheres to the nondischarged areas and can be transferred to a receiving member such as paper in imagewise configuration.

The conductive substrate and layer of photoconductive material, which normally contains a resistive barrier layer between the substrate and photoconductive material and may have a protective overcoating on the surface of the photoconductive layer, is generally referred to as the photoreceptor. Typically, the photoconductive material used in photoreceptors is amorphous selenium or an alloy thereof. As is well known, amorphous selenium and selenium alloy photoreceptors are sensitive materials, being easily scratched or electrically affected by foreign objects or human hand contact.

Photoreceptors are sometimes damaged in field use such as by paper scratching and handling damage which may occur when the photoreceptor is installed or serviced. In addition, foreign matter such as paper clips may come into contact with the photoreceptor during the copying process and gouge the layer of photoconductive material. The damaged photoreceptor is left with depressions on its surface which reduce copy quality. In the case where the depression is deep enough so as to protrude through the photoconductive material to the conductive substrate, the damaged area cannot hold a charge and will not contribute to the formation of the latent image. Less severe scratches which do not form depressions through the entire thickness of the photoconductive layer may be revealed on the finished copy. Copy quality may be reduced since the photoconductive material remaining in the damaged area may have a contrast potential less than the sensitivity of the system. In addition, as the imaging and development cycle is repeated, toner particles tend to buildup in the depressions since ordinary photoreceptor cleaning techniques are effective in removing toner only when it is on a relatively smooth surface. The buildup of toner particles, which are normally nonconductive, results in damaged areas retaining their charge during exposure and thereby forming part of the latent image. These areas are developed along with the rest of the latent image and ultimately show up as dark areas when the toner is transferred from the photoreceptor to the paper.

As the photoreceptor receives progressively more scratches, it reaches a point where copy quality is unacceptable whereupon it must be replaced or repaired with the latter option obviously being preferred. One method of repairing selenium based photoreceptors involves buffing the damaged areas to physically remove the depression by abrading away the photoconductive material in the scratched area down to a thickness commensurate with the total layer thickness less the depth of the depression. While various polishes and buffing agents have been utilized in selenium repair they have been found unsatisfactory for many reasons. Some are too abrasive resulting in damage to the affected area of application. Others contain constituents which leave a film on the selenium photoreceptor surface resulting in an electrostatically occluded area. Additionally, some buffing compositions require more than ordinary technique and care thereby rendering them unsatisfactory for field application, i.e., in offices and any other places where copiers are placed.

In copending applications, Ser. Nos. 512,803 and 512,084 there are disclosed abrasive compositions which overcome many of the disadvantages noted above. The disclosed compositions are particularly useful for small selenium surface scratches, that is, damaged areas in which the material integrity has not been disturbed.

For these selenium photoreceptors in which serious damage occurs by way of a deep scratch or fissure, abrasive compositions are of minimal aid for repair. Because the fissure is generally so deep, abrasion must occur to the level of such damage thereby resulting in an erosion of the photoconductive properties of the selenium. Moreover, tampering with the damaged area in an attempt to close the fissure can result in crystallization of the amorphous selenium.

Historically, it is well known that the crystalline forms of selenium are thermodynamically more stable than the photoconductive amorphous, or vitreous form. Because of this the heating of amorphous selenium gradually transforms the material into the less photoconductive crystalline forms. The addition of impurities generally accelerates the heat recrystallization of selenium. It is for these reasons that the manual handling of a selenium or selenium alloy photoreceptor results in damage to its photoconductive properties. The heat sensitivity of amorphous selenium has been such an established fact that any concept of selenium repair by applying heat to a damaged selenium photoreceptor has heretofore been virtually unthinkable. The ability to apply heat to repair damaged selenium photoreceptors would have obvious advantages.

OBJECTS OF THE INVENTION

Accordingly, it is an object of the present invention to provide a method for heat welding selenium.

A further object is to provide such a method which can be carried out utilizing a number of heating elements.

An additional object is to provide a simple method for repairing damaged selenium photoreceptors which is expeditious and can be used without special training and/or exceptional equipment.

SUMMARY OF THE INVENTION

The present invention relates to a method for the repair of selenium photoreceptors by heat welding a damaged area thereof. Specifically, the method includes applying a concentrated heat source to a damaged area of the photoconductor in a motion traverse to the damaged area whereby a melting and quenching of the selenium occurs in the minute areas affected. In one embodiment of the present method a heat welding probe is manually applied to a damaged area of a selenium photoreceptor in an oscillating motion traverse to the path of damage to accomplish a mending of same.

In yet another embodiment of the present invention an apparatus is utilized to heat weld a damaged selenium photoreceptor. The apparatus includes a support frame; a motor device, including a protruding orbitally oscillatable drive shaft, mounted on the frame; and means for providing a source of heat affixed to the orbitally oscillatable motor drive shaft that the apparatus is traversely movable across a damaged area of a photoreceptor upon activation of the motor. The heating means in both embodiments of the invention include electrical resistance wire through which a current is passed thereby causing it to rise to a temperature above the melting point of amorphous selenium and selenium alloys.

BRIEF DESCRIPTION OF THE DRAWINGS

The invention will now be more particularly described by reference to the accompanying drawings in which.

DETAILED DESCRIPTION OF THE DRAWINGS

Figure 1:
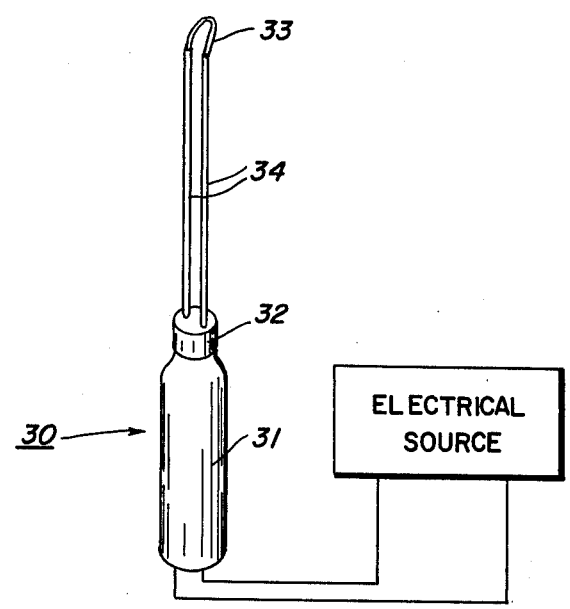
FIG. 1 is a perspective view of one apparatus for carrying out the present invention.

Referring now to FIG. 1, an apparatus is shown which is used in one embodiment of the present invention. The apparatus 30 comprises a motor element 31 to which is connected a drive shaft 32 which in turn supports a probe element 33 shown as a loop of electrical resistance wire in the figure. The motor 31 may be any type of system which creates vibration of the drive shaft support 32 and consequently of the electrical resistance probe wire element 33. Typical motors would include those used in electric tooth brushes. The electrical resistance wire 33 may be any type of wire which heats above the melting point of selenium when current is passed therethrough and does not chemically react with selenium. Typical wire materials include tungsten, molybdenum, and alloys of nickel and chromium. As shown in the figure the high resistance wire terminates at a pair of rigid sleeve elements 34 which hold electrical wire which run through the drive shaft support 32 and motor body 31 and are connected to electrical terminals as shown in the figure.

Figure 2:
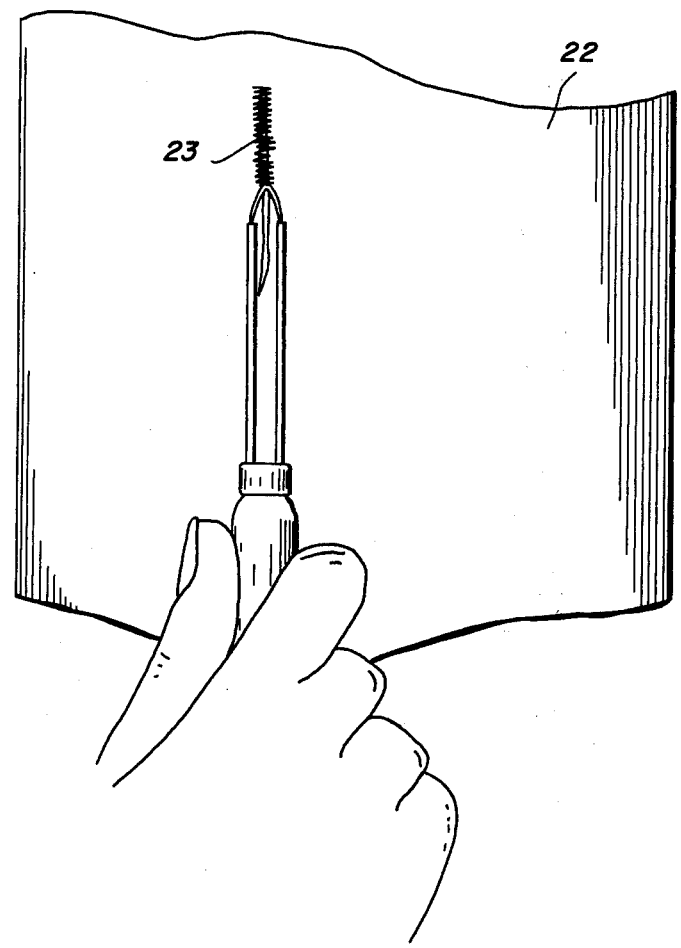
FIG. 2 is a perspective view of one embodiment of the instant invention.

The use of the apparatus 30 shown in FIG. 1 is fully demonstrated in FIG. 2. As shown the vibrating wire 33 being activated by motor element 31 is manually applied to a damaged path 23 on a selenium photoconductor 22. By a combination of hand movement and motor actuation an oscillating motion of the hot wire element 33 is effected traversely to the path of photoconductor damage 33. This results in the melting of the selenium on both sides of the damage path and quick resolidification of the amorphous photoconductor with a consequent mend or weld of the path. Because a heat source is applied to a minute area for such a small increment of time with a large surrounding sink of lower temperature the amorphous photoconductor retains its vitreous character with the desirable photoconductivity.

It is important to note that it is the combination of hand control vibrational motoring which yields the oscillatable motion necessary for the results in the instant embodiment. However, manual control and/or motor activation could singly accomplish the same results within the purview of the present method. In this regard the apparatus 30 of FIG. 1 is merely illustrative of the many devices which could be utilized. Therefore, any means of applying a heat source above the melting point of selenium in an oscillatable manner traverse to the area of damage of a selenium photoconductor can be utilized. For example, such simple items as a flame heated probe or pin element may be employed in the present process.

Figure 3:
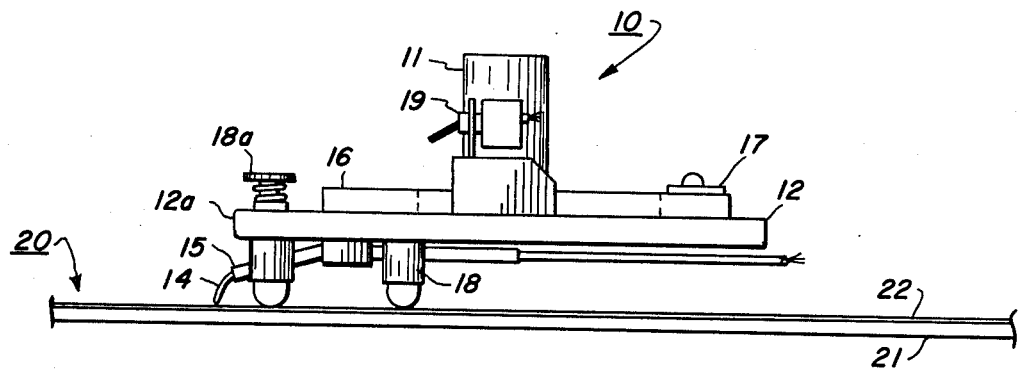
FIG. 3 is a diagrammatic side view of another apparatus of the present invention.
Figure 4:
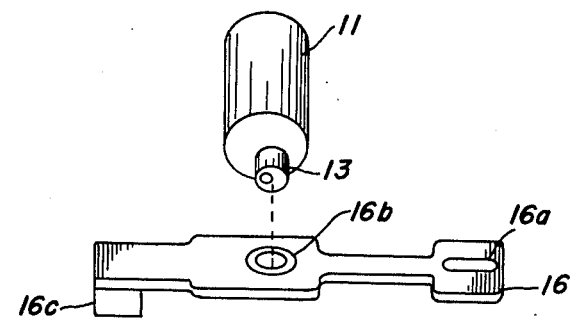
FIG. 4 is a perspective view of the motor utilized in the apparatus of FIG. 3.

FIGS. 3-6 relate to solely motorized actuation embodiments of the present process. Referring now to FIG. 3 another apparatus of the instant invention is shown and designated as 10. The apparatus 10 is comprised of an orbitally oscillatable motion motor 11 affixed to a metallic forked support frame 12 (more amply shown in FIG. 6). Reference to FIG. 4 demonstrates that the motor 11 includes a protruding drive shaft 13 which issues below the horizontal plane of metallic support frame 12 shown in FIG. 3. Further reference to both FIG. 3 and 4 indicates an electrical resistance wire element 14 connected by means of rigid sleeves 15 to an arm lever which is pivotally mounted to support frame 12 at 17 and connected to drive shaft element 13 of motor 11 in a manner as shown in FIG. 4. Note in FIG. 4 the general construction of the lever arm 16 with its pivotal point 16A, shaft element hole 16B, and wire connector element 16C located below the plane of the lever arm.

Combining FIGS. 3 and 4, it is seen that electrical resistance wire element 14 is in a descending loop configuration and connected to element 16C of the lever arm 16 by means of rigid wrapping sleeve elements 15 which descend from the horizontal plane of the apparatus as shown in FIG. 1. In this manner the resistance wire element 14 is made ostensibly available to the photoconductor material designated as 22 in FIG. 1. Additionally shown in FIG. 3 is a plurality of parallel support members 18 including an adjustably movable support 18A which enables the lowering or heightening of the heated element 14 so as to alternatively conform to deep or surface damage of a photoreceptor. Adjustment of 18A is used to bring the heated wire loop 14 into the desired degree of contact with the selenium surface under repair.

Figure 6:
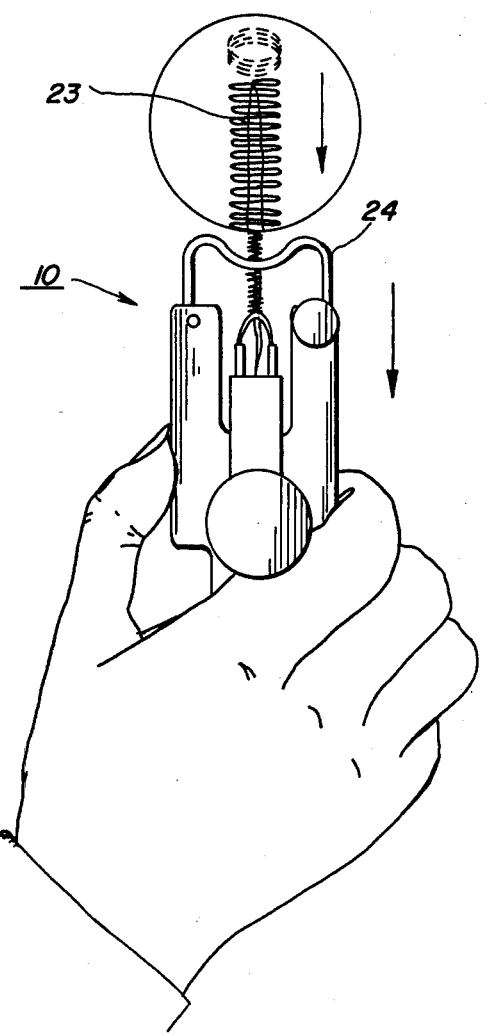
FIG. 6 is a perspective view of another embodiment of the present invention.

Also shown in FIG. 3 is a switch element 19 which simply activates the motor 11. Not shown but completely within the spirit of the instant invention is use of any type of guide bar on the forked ends 12A of the support element 12 for purposes of guiding the apparatus over a damaged area of a photoconductor. One such guide bar is shown in FIG. 6.

It is to be understood that the means by which the motor element 11 provides orbitally oscillatable motion is not critical to the present embodiment. Therefore the use of cams and other physical devices to accomplish orbitally oscillatable motion of the drive shaft is within the spirit and scope of the present invention. It is also to be well understood that while the drive shaft of the present embodiment is described as protruding, any type of orbitally oscillatable shaft will function within the purview of the present invention.

Further reference to FIG. 3 indicates the generalized schematic of a selenium photoreceptor designated as 20. The selenium photoreceptor 20 is comprised of a metallic substrate 21 with a layer 22 of selenium or a selenium alloy 22 coated thereon. In the present embodiment the tip of the loop will be applied to a damaged area of the selenium layer 22 and thereafter the electrical resistance wire 14 will be activated to generate heat. In this regard it is to be noted that it is well known in xerography that selenium or any photoconductive selenium alloy is sensitive and therefore the support legs 18 of the apparatus 10 which will come in contact with the selenium layer 22 should have a non-abrasive or soft material contacting the surface of a photoconductor. In this regard the legs 18 generally have synthetic resin tips such as teflon. It is to be understood within the purview of the present invention that the term selenium refers to both amorphous selenium and amorphous selenium alloys.

Referring now to FIG. 4 there is shown a perspective view of the orbitally oscillating motor and lever combination used within the instant embodiment of the present invention. Therefore, there is illustrated a general body of a motor 11 along with the previously discussed protruding drive shaft 13. The motor of the present combination is deliberately designed to effect orbitally oscillating motion of the drive shaft 13 as shown in the figure. In this manner an orbitally oscillating motion is conveyed to the pivoted lever arm 16 which in turn causes the same motion in the loop of high resistance wire 14 whereby same may be applied to move traversely to a damaged area of a photoconductor. This will be explained more fully hereinafter with regard to FIG. 6. While the motor 11 of FIG. 4 has been shown in simplified form, it is to be understood that any type motor which can effect the orbitally oscillating motion of the drive shaft 13, as shown in the figure may be utilized. Moreover, any type motor which ultimately effects the orbitally oscillating movement of the electrical resistance wire may be employed.

Figure 5:
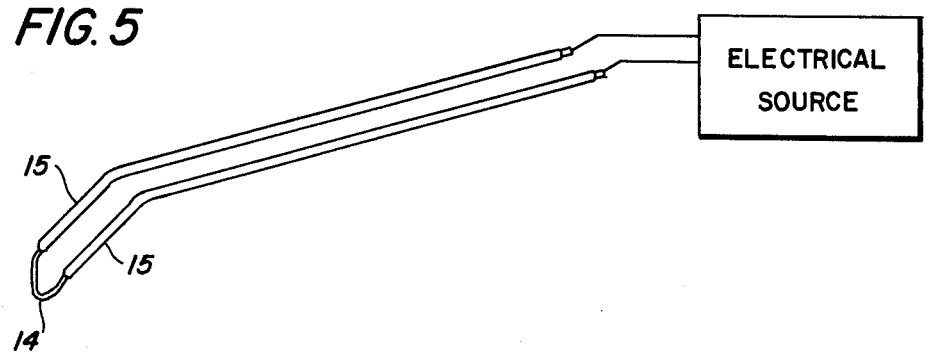
FIG. 5 is a diagrammatic view of the heating means of the apparatus of FIG. 3.

Referring now to FIG. 5 there is demonstrated a loop-like configuration of electrical resistance wire heating element 14 demonstrated in FIG. 3. Note that the wire is formed in an angular loop and connected to the ends of two rigid sleeve elements 15 which act as a wrapping for the electrical wire to which the resistance loop 14 is connected. The sleeves are rigid for support of the wire loop 14 which is angularly displaced downward from the vertical plane, the wire being in a cobra-like fashion, to render the electrical resistance wire 14 available to the photoreceptor 20 as shown in FIG. 3. When sufficient current is applied to the electrical resistance wire 14 it heats and glows to a temperature above the melting point of selenium. When this is accomplished along with actuating the orbitally oscillating motor 12 shown in FIG. 3, the heating element 14 may be applied to a damaged selenium area and welding is accomplished by heating in an orbitally oscillating motion across the damaged path (see FIG. 6). With regard to the instant embodiment wire element 14 may be any high electrical resistance wire which heats above the melting point of selenium when current is applied thereto and does not chemically react with the selenium. Preferred high resistance wire elements include tungsten, molybdenum, and alloys of nickel and chromium.

It is to be well understood that while the heating means in the present welding apparata has been described with reference to an electrically resistant wire element, any heating means which accomplishes the source heating in an oscillating manner as performed by both apparata of the present embodiments is well within the purview of same. Therefore, any element which can be affixed or connected to the oscillating drive shafts of the motors of FIGS. 1 and 3 may be considered within the purview of the present invention. Specifically contemplated are pointed or sharpened metallic elements which can be flame heated prior to application to a selenium photoreceptor.

In FIG. 6 there is demonstrated the application of the orbitally oscillatable welding device of FIG. 3 to a damaged area of a selenium photoreceptor. The area of application has been magnified and exaggerated in the circle outline for purposes of illustration. As can be seen in the figure the welding apparatus 10 is applied along the path of the damaged or scratched area 23 of the photoreceptor 20. The direction of the apparatus may be aided by a guide bar 24 which indicates the center of the damaged path as well as midpoint of orbital oscillation of the resistance wire element 14. As the welding apparatus is applied to the damaged path the heating element is moved traversely in orbitally oscillating motion across the damaged path thereby melting the selenium on both sides of said damaged area. The liquid selenium formation as well as the orbitally oscillating motion causes a weld or healing of the damaged area.

It is important in the technique of utilizing the instant method that constant directional motion of any device be accomplished over the totally damaged path so that very quick heating and cooling of the selenium is accomplished. In this way a weld is formed without recrystallization of the selenium in the damaged area and therefore no degradation of the photoconductive properties of the selenium results. While it is not completely understood how a particular heating element accomplishes the weld without crystallization of the selenium, it is hypothesized that the very fast heating of the selenium caused by the oscillating motion of the heating element traverse to the damaged area as well as the directional movement over same enables the small area of selenium affected to quickly cool in the huge sink of colder selenium surrounding it thereby making it thermodynamically possible for the selenium not to recrystallize.

Generally after the weld has been formed by application such as that described in FIGS. 2 and 6, pumicing the weld area with abrasive compositions such as those described in copending applications, Ser. Nos. 512,803 and 512,804 is desirable. While the formation of the weld results in a homogeneous surface there is a slight roughness resulting from the oscillating movement of the heating element. Therefore, pumicing is generally desirable to accomplish a completely smooth surface.

Before utilizing the present selenium repair method it is generally desirable to clean the damaged area or path of any additional foreign material. This can be accomplished by mechanically brushing the damaged area with a soft brush material or, in the instance of a scratched area, by the application and removal of a plastic film which may be applied as solvent solutions and removed after drying. If foreign materials are allowed to remain in the midst of a welded area of the selenium then the photoconductive properties of the material will be occluded and will show up in copies from the photoconductor.

It is to be understood that throughout the instant specification reference to the term selenium means selenium and selenium alloys. Therefore, the repair of a selenium photoconductor applied to amorphous selenium and vitreous selenium alloys.

To recapitulate, the present invention relates to a method for repairing damaged selenium photoconductors comprising applying a concentrated source of heat in an oscillating motion in a direction traverse to a damaged area on the selenium whereby a weld healing of the photoconductor material occurs. Additionally, the present process may be preceded by a cleaning step and may be followed by a smoothing step by application of an abrasive.

While the invention has been described with reference to the structures disclosed herein, it is not confined to the details set forth, and this application is intended to cover such modifications or changes as may come within the purposes of the improvements or the scope of the following claims.

What is claimed is:

1. A method for repairing damaged selenium photoconductors comprising:
    applying a concentrated source of heat to a minute region of the photoconductor including a damaged area of selenium, in an oscillating motion traverse to the damage for such period of time that a weld healing of the damaged photoconductor material occurs.
2. The method of claim 1 additionally comprising:
    cleaning the damaged area of the photoconductor prior to the application of a heat source.
3. The method of claim 1 additionally comprising:
    polishing the welded area of the selenium with an abrasive composition to smooth the previously damaged area.
4. The method of claim 1 wherein the heat source is a metallic probe element.
5. The method of claim 4 wherein the tip of the metallic probe is in the form of a loop of electrical resistance wire.
6. The method of claim 5 wherein the high electrical resistance wire is tungsten, molybdenum, or an alloy of nickel and chromium.
7. The method of claim 6 wherein the wire tipped probe is driven by an oscillatable motor element.
8. The method of claim 7 wherein the wire tipped probe is driven by an orbitally oscillatable motor.

* * * * *